United States Patent
Tateishi

(10) Patent No.: US 8,058,860 B2
(45) Date of Patent: Nov. 15, 2011

(54) SINGLE PIN MULTI-VID BIT INTERFACE CIRCUIT FOR DYNAMIC VOLTAGE CHANGE OF A DC/DC CONVERTER

(75) Inventor: Tetsuo Tateishi, Nagoya (JP)

(73) Assignee: Texas Instruments Incorporated, Dallas, TX (US)

( * ) Notice: Subject to any disclaimer, the term of this patent is extended or adjusted under 35 U.S.C. 154(b) by 237 days.

(21) Appl. No.: 12/491,787

(22) Filed: Jun. 25, 2009

(65) Prior Publication Data

US 2010/0001702 A1   Jan. 7, 2010

Related U.S. Application Data

(60) Provisional application No. 61/077,801, filed on Jul. 2, 2008.

(51) Int. Cl.
*G05F 1/00* (2006.01)
(52) U.S. Cl. .......................................... 323/285
(58) Field of Classification Search ........... 323/282–285
See application file for complete search history.

(56) References Cited

U.S. PATENT DOCUMENTS

| 5,831,421 | A | * | 11/1998 | Taira et al. ................. 323/314 |
| 5,852,549 | A | * | 12/1998 | Heeringa ..................... 363/18 |
| 5,905,370 | A | | 5/1999 | Bryson |
| 5,943,227 | A | | 8/1999 | Bryson et al. |
| 6,192,420 | B1 | | 2/2001 | Tsai et al. |
| 6,625,757 | B1 | | 9/2003 | Goodman |
| 6,772,356 | B1 | | 8/2004 | Qureshi et al. |
| 6,798,180 | B2 | * | 9/2004 | Sase et al. ................. 323/282 |
| 7,586,357 | B2 | * | 9/2009 | Rentala et al. ............. 327/309 |
| 2002/0194516 | A1 | | 12/2002 | Muratov et al. |
| 2005/0278490 | A1 | * | 12/2005 | Murayama ................. 711/154 |
| 2007/0014063 | A1 | * | 1/2007 | Sheng et al. .............. 361/91.1 |
| 2007/0216383 | A1 | * | 9/2007 | Al-Shyoukh et al. ....... 323/280 |
| 2008/0174286 | A1 | * | 7/2008 | Chu et al. .................. 323/271 |

FOREIGN PATENT DOCUMENTS

EP    0 872 790    10/1998

* cited by examiner

*Primary Examiner* — Adolf Berhane
*Assistant Examiner* — Jeffrey Gblende
(74) *Attorney, Agent, or Firm* — John J. Patti; Wade J. Brady, III; Frederick J. Telecky, Jr.

(57) ABSTRACT

A controller for a DC/DC converter is provided. The controller comprises an error circuit, control logic, a high side driver, a low side driver, and an interface circuit. The error circuit is coupled to a feedback terminal so as to receives a feedback signal and is coupled to the control logic. The high side driver is coupled to the control logic and to a first output terminal so as to provide a first actuation signal, and the low side driver is coupled to the control logic and to a second output terminal so as to provide a second actuation signal. The interface circuit is also coupled to the control logic, including a first, second, and third voltage source, interface comparators, and current limited amplifier.

18 Claims, 3 Drawing Sheets

US 8,058,860 B2

SINGLE PIN MULTI-VID BIT INTERFACE CIRCUIT FOR DYNAMIC VOLTAGE CHANGE OF A DC/DC CONVERTER

CROSS-REFERENCE TO RELATED APPLICATIONS

This application claims priority to U.S. Patent Application Ser. No. 61/077,801, filed on Jul. 2, 2008, which is hereby incorporated by reference for all purposes.

TECHNICAL FIELD

The invention relates generally to a voltage converter and, more particularly, to a programmable DC/DC converter.

BACKGROUND

Many circuit, such as various processing units, routinely have different voltage requirements based on operating modes. These voltage changes are generally controlled by voltage identification (VID) signals or VID codes. Many circuits, through, use multiple pins for these types of controls, but it is desirable to reduce the number of pins to lower cost. Some examples of conventional circuits are: European Patent No. 0872790; U.S. Pat. No. 5,905,370; U.S. Pat. No. 5,943,227; U.S. Pat. No. 6,192,420; U.S. Pat. No. 6,625,757; U.S. Pat. No. 6,772,356; U.S. Pat. No. 6,798,180; and U.S. Patent Pre-Grant Publ. No. 2002/0194516.

SUMMARY

A preferred embodiment of the present invention, accordingly, provides an apparatus. The apparatus comprises an error circuit that is coupled to a feedback terminal so as to receives a feedback signal; control logic that is coupled to the error circuit; a high side driver that is coupled to the control logic and to a first output terminal so as to provide a first actuation signal; a low side driver that is coupled to the control logic and to a second output terminal so as to provide a second actuation signal; and an interface circuit that is coupled to the control logic, wherein the interface circuit includes: a first voltage source; a second voltage source that is coupled to the first voltage source; a third voltage source that is coupled to the first voltage source; a first interface comparator that is coupled to a selection terminal and the second voltage source; a second interface comparator that is coupled to the selection terminal and the third voltage source; and an output current limited amplifier that is coupled between the first voltage source and the selection terminal.

In accordance with a preferred embodiment of the present invention, the interface circuit further comprises an OR gate that is coupled to each of the first and second interface comparators.

In accordance with a preferred embodiment of the present invention, the apparatus further comprises a delay element that is coupled between the interface circuit and the control logic.

In accordance with a preferred embodiment of the present invention, the apparatus further comprises: a first buffer that is coupled to a threshold terminal; a second buffer that is coupled to the threshold terminal; a switch that is coupled to the second buffer, wherein the switch is controlled by the interface circuit; an overcurrrent comparator that is coupled to a switching terminal, the first buffer, and the control logic; and a zero-crossing comparator that is coupled to the switch, the switching terminal, and the control logic.

In accordance with a preferred embodiment of the present invention, the apparatus further comprises: an undervoltage comparator that receives a first reference voltage and that is coupled to the feedback terminal and the control logic; and an overvoltage comparator that receives a second reference voltage and that is coupled to the feedback terminal and the control logic, wherein the overvoltage comparator and undervoltage comparator are disabled for a predetermined period following a change between voltage identification (VID) signals.

In accordance with a preferred embodiment of the present invention, the apparatus further comprises: a voltage divider that is coupled to the feedback terminal; a first resistor that is coupled to the feedback terminal; a second resistor that is coupled to the feedback terminal; a first transistor that is coupled between the first resistor and ground, wherein the first transistor is actuated and deactuated by a first VID signal; a second transistor that is coupled between the second resistor and ground, wherein the second transistor is actuated and deactuated by a second VID signal; an RC network that is coupled to the control electrodes of the first and second transistors and the selection terminal and that receives the first and second VID signal.

In accordance with a preferred embodiment of the present invention, the RC network further comprises: a third resistor that is coupled to the selection terminal; a first capacitor that is coupled between the control electrode of the first transistor and the third resistor, wherein the first capacitor receives the first VID signal; and a second capacitor that is coupled between the control electrode of the second transistor and the third resistor, wherein the second capacitor receives the second VID signal.

In accordance with a preferred embodiment of the present invention, wherein the error circuit is an error comparator.

In accordance with a preferred embodiment of the present invention, an apparatus is provided. The apparatus comprises an error circuit that is coupled to a feedback terminal so as to receives a feedback signal; control logic that is coupled to the error circuit; a high side driver that is coupled to the control logic and to a first output terminal so as to provide a first actuation signal; a low side driver that is coupled to the control logic and to a second output terminal so as to provide a second actuation signal; a high side switch that is coupled to a switching node, wherein the high side switch includes a control electrode that is coupled to the first output terminal; a low side switch that is coupled between the switching node and ground, wherein the low side switch includes a control electrode that is coupled to the second output terminal; an inductor coupled to the switching node; a voltage divider that between coupled to the inductor and the feedback terminal; a capacitor that is coupled between the inductor and ground; and an interface circuit that is coupled to the control logic, wherein the interface circuit includes: a first voltage source; a second voltage source that is coupled to the first voltage source; a third voltage source that is coupled to the first voltage source; a first interface comparator that is coupled to a selection terminal and the second voltage source; a second interface comparator that is coupled to the selection terminal and the third voltage source; and an output current limited amplifier that is coupled between the first voltage source and the selection terminal.

In accordance with a preferred embodiment of the present invention, an apparatus is provided. The apparatus comprises an error comparator that is coupled to a feedback terminal so as to receives a feedback signal; control logic that is coupled to the error comparator; a high side driver that is coupled to the control logic and to a first output terminal so as to provide a first actuation signal; a low side driver that is coupled to the control logic and to a second output terminal so as to provide a second actuation signal; and an interface circuit that is coupled to the control logic, wherein the interface circuit includes: a first voltage source; a second voltage source that is coupled to the first voltage source; a third voltage source that is coupled to the first voltage source; a first interface comparator that is coupled to a selection terminal and the second voltage source; a second interface comparator that is coupled to the selection terminal and the third voltage source; an output current limited amplifier that is coupled between the first voltage source and the selection terminal; and an OR gate that is coupled to each of the first and second interface comparators; a delay element that is coupled between the interface circuit and the control logic; a first buffer that is coupled to a threshold terminal; a second buffer that is coupled to the threshold terminal; a switch that is coupled to the second buffer, wherein the switch is controlled by the interface circuit; an overcurrrent comparator that is coupled to a switching terminal, the first buffer, and the control logic; a zero-crossing comparator that is coupled to the switch, the switching terminal, and the control logic; an undervoltage comparator that receives a first reference voltage and that is coupled to the feedback terminal and the control logic; an overvoltage comparator that receives a second reference voltage and that is coupled to the feedback terminal and the control logic, wherein the overvoltage comparator and undervoltage comparator are disabled for a predetermined period following a change between VID signals.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
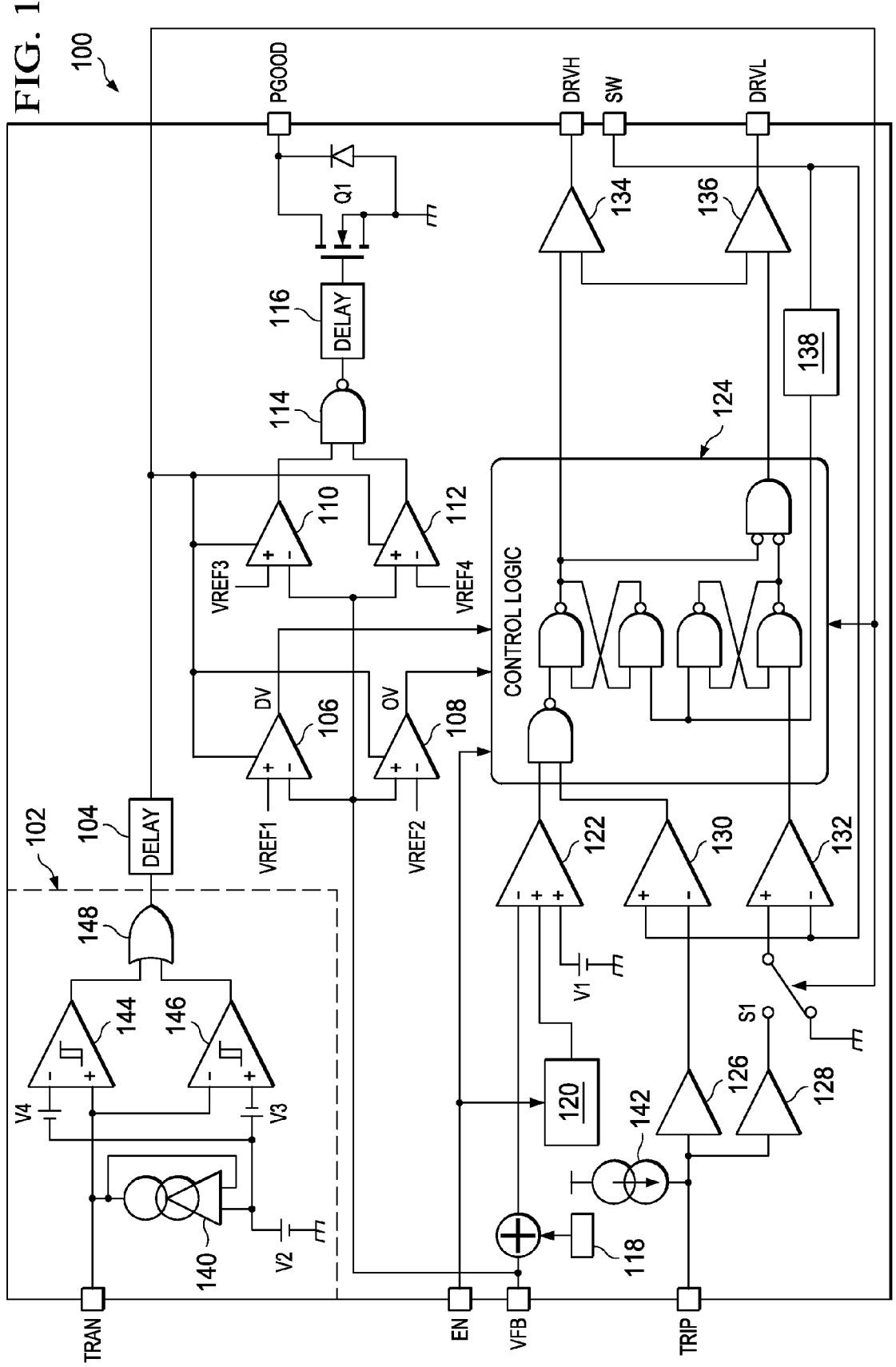
FIG. 1 is a block diagram of an example of a controller for a DC/DC converter in accordance with a preferred embodiment of the present invention.

Refer now to the drawings wherein depicted elements are, for the sake of clarity, not necessarily shown to scale and wherein like or similar elements are designated by the same reference numeral through the several views.

Referring to FIG. 1 of the drawings, the reference numeral 100 generally designates a controller for DC/DC converter. Controller 100 generally comprises interface circuit 102, delay elements 104 and 116, comparators 106, 108, 110, 112, 130, and 132, NAND gate 114, ramp compensator 118, softstart control 120, error comparator or error circuit 122, control logic 124, reference voltage generators 126 and 128, high side driver 134, low side driver 136, one-shot 138, current source 142, voltage source V1, Reference voltages VREF1 through VREF4, transistor Q1, switch S1, and pins or terminals TRAN, EN, VFB, TRIP, PGOOD, DRVH, SW, and DRVL. Typically, controller 100 is an integrated circuit (IC) or chip where external components, such as resistors and capacitors, are coupled to form a DC/DC converter.

In operation, the error comparator 122, control logic 124, and drivers 134 and 136 operate to generate control or actuation signals. Error comparator 122 is coupled to the feedback terminal VFB so as to receive a feedback signal (that can be modified by ramp compensator 118). Error comparator 122 then compares the feedback signal to a reference voltage from voltage source V1 (for example, about 0.6V) to generate a pulse width modulation (PWM) signal for the control logic 124. Softstart control 120 (which is enabled when the enable terminal EN is asserted and generates ramp signal to offer soft start function) can also influence PWM signal when a softstart mode is enabled. Control logic receives this PWM signal from error comparator 122 and generates control signals for the high and low side drivers 134 and 136. These high and low side drivers 134 and 136 are coupled to output terminals DRVH and DRVL to provide actuation signals to external components (such as transistors or switches). Additionally, one-shot 138 is coupled between the control logic and switching terminal SW to limit the on time of an external high side switch or transistor.

Controller 100 also provides circuit for zero-crossing detection or negative overcurrent protection and overcurrent protection. With this feature, a threshold voltage or signal can be provided to the threshold terminal TRIP to set the level of protection. For example, the voltage level can be set by a resistor coupled to ground (such as resistor R3 of FIG. 2A). Coupled to the threshold terminal TRIP is a current source 142 (which can provides 10 µA, for example) and a reference voltage generator 126. The reference voltage generator 126 generates overcurrent threshold voltage as a function of the voltage applied to the terminal TRIP (which can be about ⅛ of the voltage applied to the terminal TRIP, for example). Overcurrent comparator 130 is coupled to reference voltage generator 126 and switching terminal SW so as to compare the voltage at a switching node to the output from reference voltage generator 126 in order to provide an overrcurrent signal to control logic 124. Switch S1 is coupled to reference voltage generator 128 (which generates a negative overcurrent threshold voltage as a function of the voltage applied to terminal TRIP that can be about −⅛ times the voltage applied to terminal TRIP, for example) and ground, and switch S1 is controlled by the interface circuit 102. Zero-crossing comparator 132 is coupled to switch S1 and switching terminal SW so as to compare the voltage at a switching node to the output of reference voltage generator 128 for negative overcurrent protection to generate a negative overcurrent signal or ground for the control logic 124. The controller 100 supports both Discontinuous Current Mode (DCM) operation, which improves light load efficiency, and Continuous Current Mode (CCM) operation, which can sink current from the output and enables discharge capability. This discharge capability is used when the output voltage is changed to lower voltage by VID code change. Zero-crossing detection is used to enable DCM operation. Since DCM operation does not have sink capability, it is preferable to change the operation mode to CCM when VID code is changes to have sink capability.

In addition to the overcurrent protection and zero-crossing detection, the controller 100 provides overvoltage and undervoltage protection. Overvoltage comparator 102 is coupled to the feedback terminal VFB so as to compare the feedback voltage to a reference voltage VREF1 (which can be about 120% of voltage source V1, for example) to generate an overvoltage signal for the control logic 124. Undervoltage comparator 108 is also coupled to the feedback terminal VFB so as to compare the feedback voltage to a reference voltage VREF2 (which can be about 70% of voltage source V1, for example) voltage to generate an undervoltage signal for the control logic 124. External measurements for overvoltage and undervoltage are provided through comparators 110 and 112, NAND gate 114, delay element 116 and transistor Q1, which compare the feedback voltage to reference voltage VREF3 and VREF4 (which can be about 115% and 90% of the voltage source V1, respectively, for example). Under conditions where the voltage is within a desired range, the output voltage on terminal PGOOD is at an open state and pulled up by an external resistor (such as resistor R2 of FIG. 2A).

To provide programmability for several voltages, interface circuit 102 is provided. The interface circuit 102 is a multi-bit circuit that is coupled to a signal pin or selection terminal TRAN and generally comprises amplifier 140, voltage sources V2 through V4, interface comparators 144 and 146, and OR gate 148. Voltage sources V2 through V4 operate as a reference voltage network with source V2 (which can be about 1.88V, for example) coupled to ground and sources V4 (which can be between about 0.15V and about 0.2V, for example) and V3 (which can be between about 0.16V and about 0.21 V, for example). Voltage source V2 is an internal bias voltage and should be chosen based upon output voltage range of amplifier 140 and input voltage range of comparator 144 and 146. Comparator 144 is coupled to selection terminal TRAN and voltage source V4, and comparator 146 is coupled to selection terminal TRAN and voltage source V3. Voltage sources V3 and V4 determine a detection window of the voltage at selection terminal TRAN. Additionally, coupled between the voltage source V1 and selection terminal TRAN is amplifier 140 (which is current limited for both sink and source and which can be about −3.8 μA and about 3.8 μA, for example). Thus, based on the input voltage to the selection terminal TRAN, the comparators 144 and 146 and amplifier 140 generate digital signals that are ORed by OR gate so as to operate as a multi-bit digital-to-analog converter that provides control signals to the control logic 124, switch S1, and comparator 106, 108, 110, and 112.

Figure 2A:
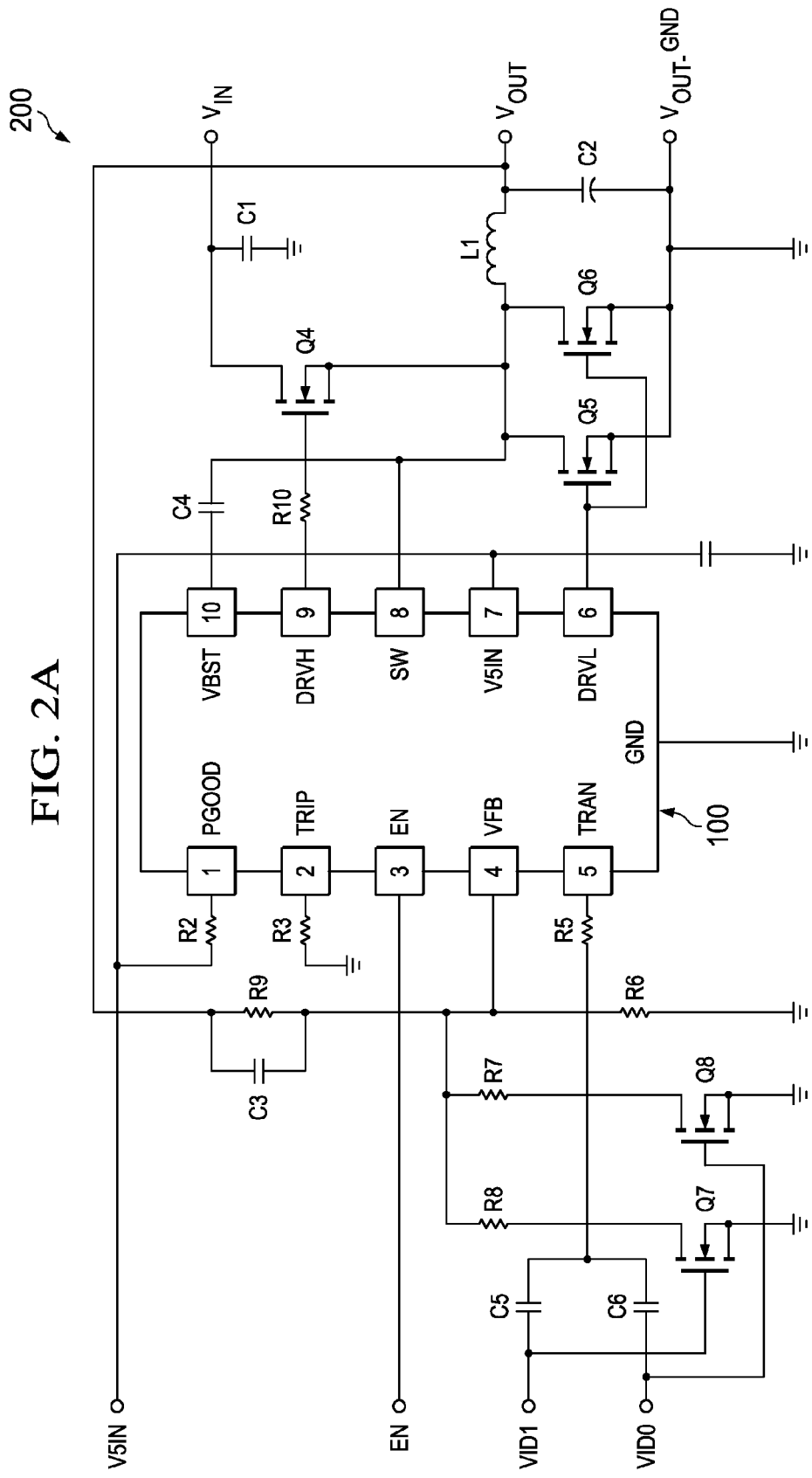
FIGS. 2A and 2B are block diagrams of an example of a DC/DC converter using the controller of FIG. 1.
Figure 2B:
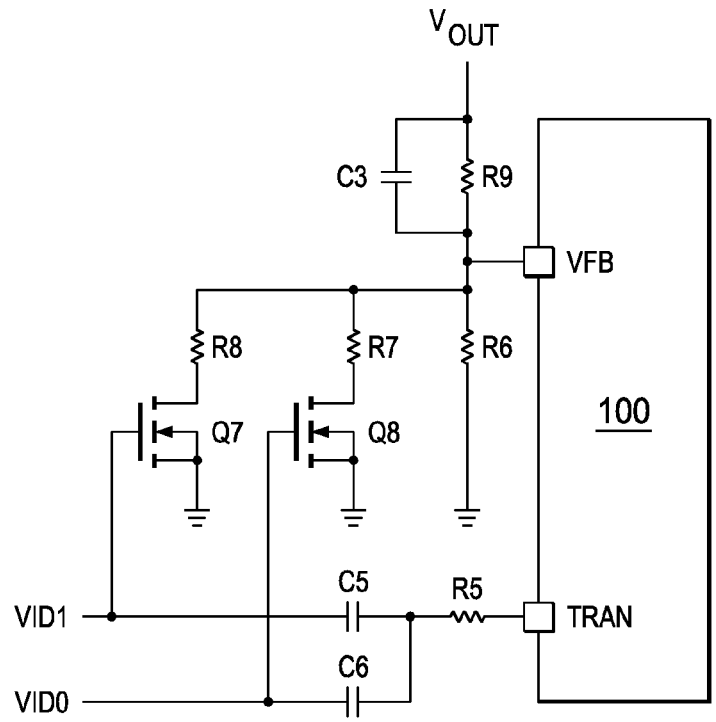

Turning to FIGS. 2A and 2B, a DC/DC converter or buck converter 200 employing controller 100 is shown. In converter 200, an input voltage VIN is provided (which is filtered by capacitor C1) to transistor Q4, which operates a high side switch and which is coupled to the switching node and switching terminal SW. Resistor R10 is coupled between output terminal DRVH and the control electrode of transistor Q4 to slow down the switching speed of transistor Q4 if needed. Transistors Q5 and Q6 (which operate as the low side switch) are coupled between the switching node (and switching terminal SW) and ground. Inductor L1 is coupled between the switching node and an output node, and capacitor C2 is coupled between the output node and ground. A voltage divider (generally comprised of resistors R9 and R6 and capacitor C3) generate a feedback voltage for feedback terminal VFB from the output node. Based on these connections, an output voltage VOUT can then be provided at the output node in accordance with the normal operation of a buck converter.

Figure 3:
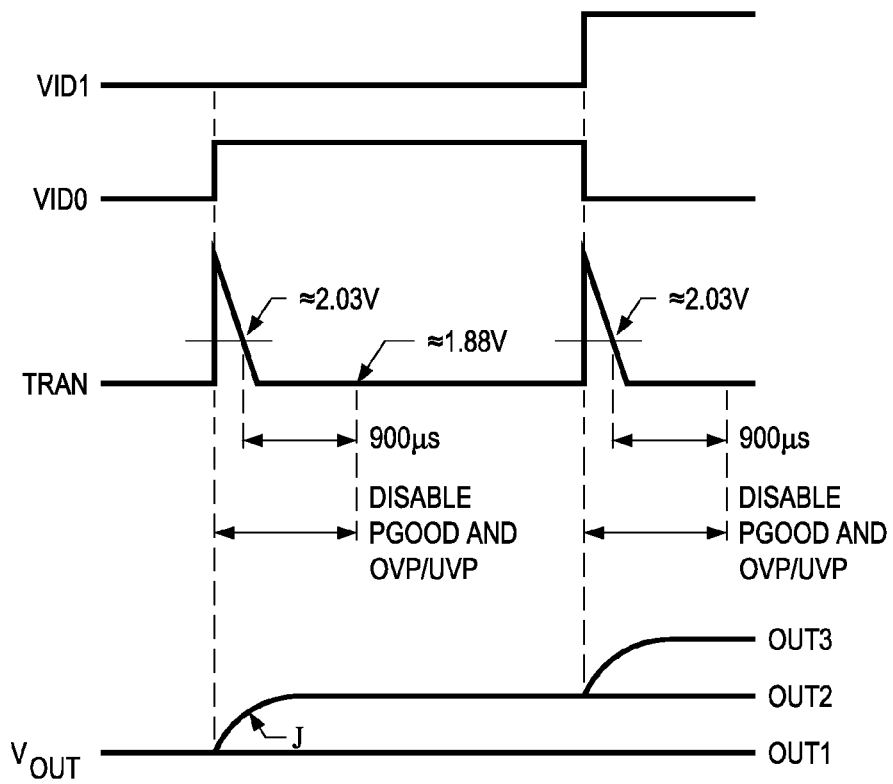
FIG. 3 is a timing diagram for the DC/DC converter of FIGS. 2A and 2B.

In addition to the normal buck operation of converter 200, the output voltage level can be controlled through an external VID circuit and the interface circuit 102. As shown, the external VID circuit is a 2-bit circuit, with each bit corresponding to a particular output voltage. VID signals are applied to capacitors C5 and C6. Capacitors C5 and C6 are binary weighted capacitors (for example, the capacitance of capacitor C6 is one-half of the capacitance of capacitor C5). When the low voltage signal VID0 is asserted, switch or transistor Q8 is actuated so that the resistor R8 is in parallel with resistor R6 (to change the feedback voltage). At the same time, the signal VID0 is applied through a portion of an RC network (capacitor C6 and resistor R5) to the selection terminal TRAN. As can be seen in FIG. 3, when signal VID0 is asserted the ramp time for the output voltage increases over time $\tau(\approx R9 \cdot C3)$ from voltage $$OUT1\left(\approx 0.6 \text{ V}\frac{R9}{R6}\right)$$

to voltage $$OUT2\left(\approx 0.6 \text{ V}\frac{R9(R6+R7)}{R6 \cdot R7}\right).$$

When the low voltage signal VID0 is changed, that voltage change is transferred to the selection terminal TRAN through capacitor C6 and resistor R5 (which is an optional resistor). The voltage change at the selection terminal TRAN can be calculated by the ratio of capacitors C5 and C6. Thus, because capacitors C5 and C6 are binary weighted capacitors, the voltage applied to the selection terminal TRAN changes by about ⅓ of low voltage signal VID0 voltage change, becoming higher than about 2.03V. Comparator 144 detects the VID code or signal change; so, for this transition time, overvoltage protection circuit 106 and undervoltage protection circuit 108 are disabled (and forcing the operation mode to CCM) for a predetermined period which is long enough to complete the output voltage transition (about 1 ms, for example). When the high voltage signal VID1 is asserted (deasserting signal VID0 as well), switch or transistor Q7 is actuated (while transistor Q8 is deactuated) so that resistor R8 is in parallel with resistor R6 (to change the feedback voltage). The signal VID1 is applied through a portion of an RC network (capacitor C5 and resistor R5) to the selection terminal TRAN. As can be seen in FIG. 3, when signal VID1 is asserted the ramp time for the output voltage increases over time $\tau$ ($\approx R9 \cdot C3$) from voltage $$OUT2\left(\approx 0.6 \text{ V}\frac{R9(R6+R7)}{R6 \cdot R7}\right)$$

to voltage $$OUT3\left(\approx 0.6 \text{ V}\frac{R9(R6+R8)}{R6 \cdot R8}\right).$$

When transitioning from signal VID0 to signal VID1, this voltage change is transferred to the selection terminal TRAN through capacitors C5 and C6 and resistor R5, which can be calculated by the ratio of capacitors C5 and C6. Because capacitors C5 and C6 are binary weighted capacitors, the voltage applied through the selection terminal changes by about ⅓ of voltage change from signal VID0 to signal VID1. Thus, the voltage becomes higher than about 2.03V and the comparator 144 detects the VID code change. Additionally, for this transition time, overvoltage protection circuit 106 and undervoltage protection circuit 108 (and forcing the operation mode to CCM) are disabled for a predetermined period which is long enough to complete the output voltage transition (about 1 ms, for example).

Therefore, control of the level of the output voltage VOUT can be accomplished through the use of one terminal or pin. Moreover, the external VID circuitry can also be provided for additional voltage signal for a multi-bit system, not simply a 2-bit system as shown.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
an error circuit that is coupled to a feedback terminal so as to receives a feedback signal;
control logic that is coupled to the error circuit;
a high side driver that is coupled to the control logic and to a first output terminal so as to provide a first actuation signal;
a low side driver that is coupled to the control logic and to a second output terminal so as to provide a second actuation signal;
an interface circuit that is coupled to the control logic, wherein the interface circuit includes:
a first voltage source;
a second voltage source that is coupled to the first voltage source;
a third voltage source that is coupled to the first voltage source;
a first interface comparator that is coupled to a selection terminal and the second voltage source;
a second interface comparator that is coupled to the selection terminal and the third voltage source; and
an output current limited amplifier that is coupled between the first voltage source and the selection terminal;
an undervoltage comparator that receives a first reference voltage and that is coupled to the feedback terminal and the control logic; and
an overvoltage comparator that receives a second reference voltage and that is coupled to the feedback terminal and the control logic, wherein the overvoltage comparator and undervoltage comparator are disabled for a predetermined period following a change between voltage identification (VID) signals.

2. The apparatus of claim 1, wherein the interface circuit further comprises an OR gate that is coupled to each of the first and second interface comparators.

3. The apparatus of claim 1, wherein the apparatus further comprises a delay element that is coupled between the interface circuit and the control logic.

4. An apparatus comprising:
an error circuit that is coupled to a feedback terminal so as to receives a feedback signal;
control logic that is coupled to the error circuit;
a high side driver that is coupled to the control logic and to a first output terminal so as to provide a first actuation signal;
a low side driver that is coupled to the control logic and to a second output terminal so as to provide a second actuation signal;
an interface circuit that is coupled to the control logic, wherein the interface circuit includes:
a first voltage source;
a second voltage source that is coupled to the first voltage source;
a third voltage source that is coupled to the first voltage source;
a first interface comparator that is coupled to a selection terminal and the second voltage source;
a second interface comparator that is coupled to the selection terminal and the third voltage source; and
an output current limited amplifier that is coupled between the first voltage source and the selection terminal;
a first buffer that is coupled to a threshold terminal;
a second buffer that is coupled to the threshold terminal;
a switch that is coupled to the second buffer, wherein the switch is controlled by the interface circuit;
an overcurrrent comparator that is coupled to a switching terminal, the first buffer, and the control logic; and
a zero-crossing comparator that is coupled to the switch, the switching terminal, and the control logic.

5. An apparatus comprising:
an error circuit that is coupled to a feedback terminal so as to receives a feedback signal;
control logic that is coupled to the error circuit;
a high side driver that is coupled to the control logic and to a first output terminal so as to provide a first actuation signal;
a low side driver that is coupled to the control logic and to a second output terminal so as to provide a second actuation signal;
an interface circuit that is coupled to the control logic, wherein the interface circuit includes:
a first voltage source;
a second voltage source that is coupled to the first voltage source;
a third voltage source that is coupled to the first voltage source;
a first interface comparator that is coupled to a selection terminal and the second voltage source;
a second interface comparator that is coupled to the selection terminal and the third voltage source; and
an output current limited amplifier that is coupled between the first voltage source and the selection terminal;
a voltage divider that is coupled to the feedback terminal;
a first resistor that is coupled to the feedback terminal;
a second resistor that is coupled to the feedback terminal;
a first transistor that is coupled between the first resistor and ground, wherein the first transistor is actuated and deactuated by a first VID signal;
a second transistor that is coupled between the second resistor and ground, wherein the second transistor is actuated and deactuated by a second VID signal; and
an RC network that is coupled to the control electrodes of the first and second transistors and the selection terminal and that receives the first and second VID signal.

6. The apparatus of claim 5, wherein the RC network further comprises:

a third resistor that is coupled to the selection terminal;
a first capacitor that is coupled between the control electrode of the first transistor and the third resistor, wherein the first capacitor receives the first VID signal; and
a second capacitor that is coupled between the control electrode of the second transistor and the third resistor, wherein the second capacitor receives the second VID signal.

7. The apparatus of claim 1, wherein the error circuit is an error comparator.

8. An apparatus comprising:
an error circuit that is coupled to a feedback terminal so as to receives a feedback signal;
control logic that is coupled to the error circuit;
a high side driver that is coupled to the control logic and to a first output terminal so as to provide a first actuation signal;
a low side driver that is coupled to the control logic and to a second output terminal so as to provide a second actuation signal;
a high side switch that is coupled to a switching node, wherein the high side switch includes a control electrode that is coupled to the first output terminal;
a low side switch that is coupled between the switching node and ground, wherein the low side switch includes a control electrode that is coupled to the second output terminal;
an inductor coupled to the switching node;
a voltage divider that between coupled to the inductor and the feedback terminal;
a capacitor that is coupled between the inductor and ground;
an interface circuit that is coupled to the control logic, wherein the interface circuit includes:
a first voltage source;
a second voltage source that is coupled to the first voltage source;
a third voltage source that is coupled to the first voltage source;
a first interface comparator that is coupled to a selection terminal and the second voltage source;
a second interface comparator that is coupled to the selection terminal and the third voltage source; and
an output current limited amplifier that is coupled between the first voltage source and the selection terminal;
an undervoltage comparator that receives a first reference voltage and that is coupled to the feedback terminal and the control logic; and
an overvoltage comparator that receives a second reference voltage and that is coupled to the feedback terminal and the control logic, wherein the overvoltage comparator and undervoltage comparator are disabled for a predetermined period following a change between VID signal.

9. The apparatus of claim 8, wherein the interface circuit further comprises an OR gate that is coupled to each of the first and second interface comparators.

10. The apparatus of claim 8, wherein the apparatus further comprises a delay element that is coupled between the interface circuit and the control logic.

11. The apparatus of claim 8, wherein the apparatus further comprises:
a first buffer that is coupled to a threshold terminal;
a second buffer that is coupled to the threshold terminal;
a control switch that is coupled to the second buffer, wherein the switch is controlled by the interface circuit;
an overcurrrent comparator that is coupled to the switching node, the first buffer, and the control logic; and
a zero-crossing comparator that is coupled to the switch, the switching node, and the control logic.

12. The apparatus of claim 8, wherein the apparatus further comprises:
a first resistor that is coupled to the feedback terminal;
a second resistor that is coupled to the feedback terminal;
a first transistor that is coupled between the first resistor and ground, wherein the first transistor is actuated and deactuated by a first VID signal;
a second transistor that is coupled between the second resistor and ground, wherein the second transistor is actuated and deactuated by a second VID signal;
an RC network that is coupled to the control electrodes of the first and second transistors and the selection terminal and that receives the first and second VID signal.

13. The apparatus of claim 12, wherein the RC network further comprises:
a third resistor that is coupled to the selection terminal;
a first capacitor that is coupled between the control electrode of the first transistor and the third resistor, wherein the first capacitor receives the first VID signal; and
a second capacitor that is coupled between the control electrode of the second transistor and the third resistor, wherein the second capacitor receives the second VID signal.

14. The apparatus of claim 8, wherein the error circuit is an error comparator.

15. An apparatus comprising:
an error comparator that is coupled to a feedback terminal so as to receives a feedback signal;
control logic that is coupled to the error comparator;
a high side driver that is coupled to the control logic and to a first output terminal so as to provide a first actuation signal;
a low side driver that is coupled to the control logic and to a second output terminal so as to provide a second actuation signal; and
an interface circuit that is coupled to the control logic, wherein the interface circuit includes:
a first voltage source;
a second voltage source that is coupled to the first voltage source;
a third voltage source that is coupled to the first voltage source;
a first interface comparator that is coupled to a selection terminal and the second voltage source;
a second interface comparator that is coupled to the selection terminal and the third voltage source;
an output current limited amplifier that is coupled between the first voltage source and the selection terminal; and
an OR gate that is coupled to each of the first and second interface comparators;
a delay element that is coupled between the interface circuit and the control logic;
a first buffer that is coupled to a threshold terminal;
a second buffer that is coupled to the threshold terminal;
a switch that is coupled to the second buffer, wherein the switch is controlled by the interface circuit;
an overcurrrent comparator that is coupled to a switching terminal, the first buffer, and the control logic;
a zero-crossing comparator that is coupled to the switch, the switching terminal, and the control logic;

an undervoltage comparator that receives a first reference voltage and that is coupled to the feedback terminal and the control logic;

an overvoltage comparator that receives a second reference voltage and that is coupled to the feedback terminal and the control logic, wherein the overvoltage comparator and undervoltage comparator are disabled for a predetermined period following a change between VID signals.

16. The apparatus of claim 15, wherein the apparatus further comprises:
  a voltage divider that is coupled to the feedback terminal;
  a first resistor that is coupled to the feedback terminal;
  a second resistor that is coupled to the feedback terminal;
  a first transistor that is coupled between the first resistor and ground, wherein the first transistor is actuated and deactuated by a first VID signal;
  a second transistor that is coupled between the second resistor and ground, wherein the second transistor is actuated and deactuated by a second VID signal;
  an RC network that is coupled to the control electrodes of the first and second transistors and the selection terminal and that receives the first and second VID signal.

17. The apparatus of claim 16, wherein the RC network further comprises:
  a third resistor that is coupled to the selection terminal;
  a first capacitor that is coupled between the control electrode of the first transistor and the third resistor, wherein the first capacitor receives the first VID signal; and
  a second capacitor that is coupled between the control electrode of the second transistor and the third resistor, wherein the second capacitor receives the second VID signal.

18. The apparatus of claim 15, wherein the apparatus further comprises:
  a high side transistor that is coupled to a switching node, wherein the high side transistor includes a control electrode that is coupled to the first output terminal;
  a low side transistor that is coupled between the switching node and ground, wherein the low side transistor includes a control electrode that is coupled to the second output terminal;
  an inductor coupled to the switching node;
  a voltage divider that between coupled to the inductor and the feedback terminal; and
  a capacitor that is coupled between the inductor and ground.

* * * * *